Sept. 13, 1932.   F. BARTLING   1,877,489
AMMONIA SODA PROCESS FOR THE PRODUCTION OF SODIUM HYDROXIDE,
NaOH, WITH SIMULTANEOUS PRODUCTION OF AMMONIA
Filed March 6, 1930
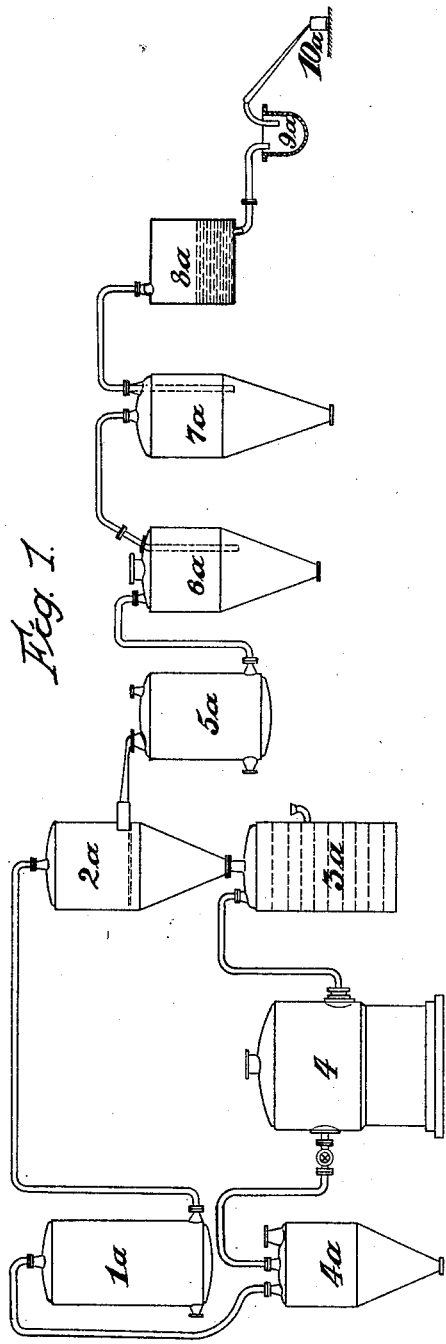
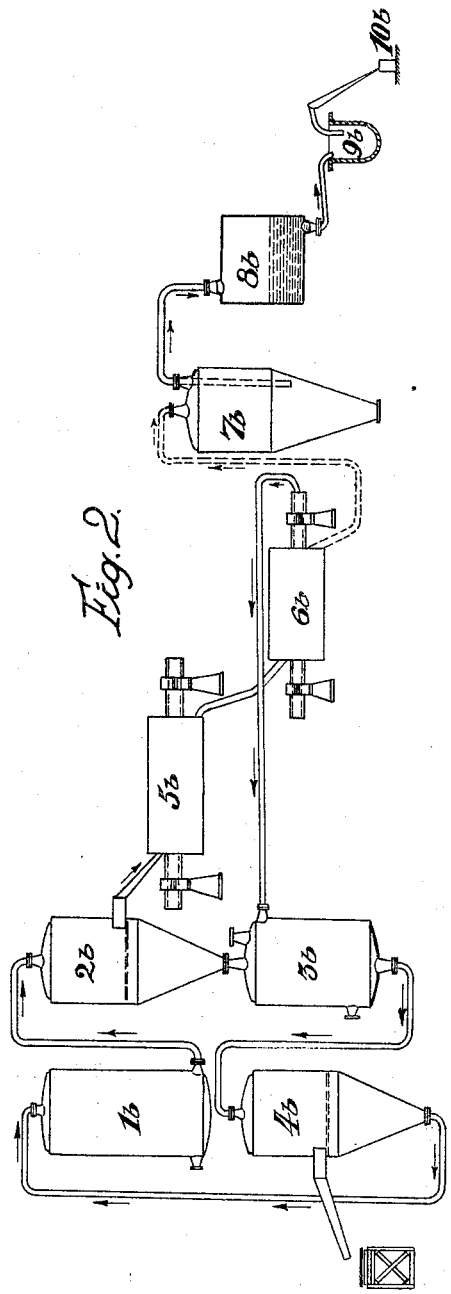

Patented Sept. 13, 1932

1,877,489

UNITED STATES PATENT OFFICE

FRIEDRICH BARTLING, OF HUGLFING, GERMANY

AMMONIA-SODA PROCESS FOR THE PRODUCTION OF SODIUM HYDROXIDE, NaOH, WITH SIMULTANEOUS PRODUCTION OF AMMONIA

Application filed March 6, 1930, Serial No. 433,700, and in Germany March 26, 1929.

The invention consists in a modification of the well known ammonia-soda process for the production of sodium hydroxide, which has for its object the additional production of considerable quantities of ammonia and, by one method of application, of ammonium chloride, without material increase of the operating expenses.

In general, in the alkali industry, two different industrial products are manufactured by the ammonia-soda process, namely—sodium carbonate $Na_2CO_3$ and sodium hydroxide (caustic soda), NaOH.

The production of sodium carbonate as a product intended for direct sale is of no interest in relation to the present invention and need not, therefore, be further referred to. The operation of the process of production of sodium hydroxide, hitherto known, will first be described with the aid of the diagrammatic representation of the installation, shown in Fig. 1.

As is well known, an intermediate product, sodium bicarbonate, $NaHCO_3$, is first precipitated by passing carbon dioxide into an ammoniacal sodium chloride solution in the precipitating vessel 1a.

The charge of the bicarbonate precipitating vessel 1a, after the $NaHCO_3$ has been precipitated, is conveyed to a filter 2a for the purpose of separating the solid sodium bicarbonate. After filtration the remaining ammonium chloride solution is conveyed to the distilling column 3a for the recovery of the ammonia.

The ammonia liberated in the column is led to a receiver 4, from which it is conveyed further, as required, into the salt solution tank 4a for the production of further ammoniacal salt solution for the precipitation process in the tank 1a.

The sodium bicarbonate, collected on the filter 2a, is conveyed to a solution tank 5a in which carbon dioxide is driven off by steam and the bicarbonate is converted into a solution of $Na_2CO_3$. This latter is then conveyed to the causticizing tank 6a, in which it is rendered caustic by the addition of quick-lime. After the completion of the causticizing process the lye is conveyed to the settling tank 7a, from which it is conveyed for evaporation to the evaporating installation 8a, which usually consists of several evaporators. From the evaporating installation the product passes to the melting pot 9a. After complete concentration the liquid caustic soda is filled into iron drums at 10a, in which it solidifies and is then ready for despatch.

Now, according to the present invention, the above-described ammonia-soda process for the production of caustic soda, NaOH, is in the first case so modified that ammonia, $NH_3$, is obtained in addition.

For this purpose, in the new process, the causticizing process, that is, the conversion of the sodium bicarbonate, $NaHCO_3$, into sodium hydroxide, NaOH, is effected in a novel and more advantageous manner, whereby a considerably greater economic benefit is achieved than is attained by the method of causticizing usually employed in the ammonia-soda process.

In accordance with this object, the present invention consists of a modified ammonia-soda process for the production of caustic soda, in which $NH_3$ is simultaneously recovered, by first converting the sodium bicarbonate in solid form, obtained in the usual manner by precipitation by carbon dioxide from an ammoniacal sodium chloride solution and subsequent filtration, into sodium cyanide by the addition of carbon and the action of nitrogen on the mixture at a high temperature (approximately 1000° C.) and then converting the sodium cyanide so formed into caustic soda and ammonia at a lower temperature (approximately 400°–500° C.) by the action of steam.

The chemical processes which occur are the following:—

As is known, sodium bicarbonate is converted into sodium carbonate in the Thelen pan at a temperature lying between 300° and 400° C.

The action of the Thelen pan, that is, the decomposition of sodium bicarbonate, is replaced in the new causticizing process by that of the apparatus in which the mixture of sodium bicarbonate and carbon is treated with nitrogen.

As is already known, the fixation of nitrogen takes place at temperatures which are higher than those required for the conversion of sodium bicarbonate, $NaHCO_3$, into sodium carbonate, $Na_2CO_3$.

The action of the nitrogen on the mixture therefore only commences when, as in the Thelen pan, the conversion of sodium bicarbonate, $NaHCO_3$, into sodium carbonate $Na_2CO_3$, in the apparatus for the production of sodium cyanide is already complete, as obviously the mixture, which enters the apparatus when cold, must have been subjected to the lower temerature at which sodium bicarbonate $NaHCO_3$ is converted into sodium carbonate $Na_2CO_3$ before it attains the temperature at which nitrogen fixation commences.

Therefore, in operating the new process, calcination in a special apparatus will usually be avoided during the causticizing process and a mixture of sodium bicarbonate, $NaHCO_3$, and carbon will be used as the raw material for such process.

Thus the process is simplified by the direct use of sodium bicarbonate.

As the conversion of sodium bicarbonate, $NaHCO_3$, into $Na_2CO_3$, has already occurred before the fixation of nitrogen, this further reaction occurs according to the following equation:—

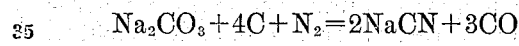
$$Na_2CO_3 + 4C + N_2 = 2NaCN + 3CO$$

When the reaction according to the above equation has proceeded to a sufficient extent, that is, when the mixture has been submitted for a sufficient length of time to a high temperature (for example, 1000°C.), and to the action of nitrogen, the sodium cyanide is cooled to a temperature lying between 400° C. and 500°C. and exposed to the action of steam at that temperature.

Caustic soda and ammonia are formed, as shown by the following equation:—

$$NaCN + 2H_2O = NaOH + CO + NH_3$$

The caustic soda obtained according to the above equation is dissolved, the solution purified by filtration, decantation or any other suitable process and then evaporated, that is, treated in exactly the same manner as the caustic soda lye produced by the ordinary ammonia-soda process.

The carbon, which is usually added in the form of coke, is recovered as carbon monoxide, this gas can be advantageously utilized as a fuel gas.

The carbon dioxide, $CO_2$ which is evolved during the conversion of sodium bicarbonate, $NaHCO_3$, into sodium carbonate, $Na_2CO_3$, can be used, for example, for the precipitation of $CO$. In the process of alkali manufacture tion of sodium bicarbonate from the ammoniacal sodium chloride solution.

The only increased costs for raw materials entailed in the conversion of sodium bicarbonate, $NaHCO_3$, into sodium hydroxide $NaOH$ by the new process are those of the introduction of nitrogen. This nitrogen can be cheaply obtained by any known process, for example, by the Linde process.

For this reason the ammonia obtained as a second product is extremely cheap, whilst the costs of manufacture of the caustic soda are not increased.

This cheaply produced ammonia, which is produced in large quantities in accordance with the equation, may be used for the most varied purposes. It is, however, very advantageous to use it, in accordance with one form of development of the new process, for the additional production of solid ammonium chloride, by introducing the ammonia obtained by the new process into the ammonia-soda process in such a manner that this additionally recovered ammonia is used to replace the ammonia precipitated from the ammonium chloride solution in the form of solid ammonium chloride.

An example of a method of arrangement of an installation for carrying out the new process is shown diagrammatically in Fig. 2.

The apparatus $1b$ and $2b$ correspond in their construction and purpose to those of an installation of the known type, as in Fig. 1.

The apparatus $5b$ and $6b$ serve for the conversion of the sodium bicarbonate into caustic soda, as do the apparatus $5a$ and $6a$ in the plant according to Fig. 1.

The actual causticizing process is, however, entirely different from that of the ordinary ammonia-soda process.

In this case the sodium bicarbonate, $NaHCO_3$, precipitated in solid form in apparatus $1b$ and $2b$, is mixed with carbon (usually in the form of coke) and then introduced into the apparatus $5b$, in which the mixture is exposed to the action of a current of nitrogen at a high temperature, for example at 1000° C.

By this means the sodium bicarbonate $NaHCO_3$, which is introduced, is converted into sodium cyanide, $NaCN$. This sodium cyanide is then conveyed to an apparatus $6b$, in which it is treated with steam at a lower temperature, which may, for example, lie between 400° C. and 500° C.

The sodium cyanide is thus converted into caustic soda, $NaOH$, and ammonia, $NH_3$.

The same purposes as are served by the bicarbonate solution tank $5a$ and causticizing tank $6a$ in the process according to Fig. 1 are served by the apparatus $5b$ and $6b$ in the modified process, in which the above-described chemical processes occur, and in which the sodium bicarbonate $NaHCO_3$ is

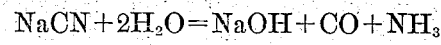

causticized with simultaneous new formation of additional ammonia $NH_3$.

From the apparatus 6b the generated caustic soda is conveyed to the tank 7b, in which it is dissolved and purified by filtration or by any other process.

The caustic soda lye is then conveyed to the evaporating installation 8b and 9b in which it is subjected to the same treatment as in the corresponding apparatus of the plant according to Fig. 1.

The final product is a marketable caustic soda, NaOH, exactly as produced by the original process.

Thus, according to the new ammonia-soda-process, in which the causticizing processes are alone carried out differently, two products are obtained for sale, that is, ammonia, $NH_3$, in addition to caustic soda, which is the original final product of the known process.

The production of ammonia in the new causticizing process enables the whole ammonia-soda process to be carried out more economically in an especially easy manner. This can be effected, as shown in Fig. 2 and described earlier in this specification, by dispensing with the decomposition in the distilling plant, with the object of recovering the ammonia, of the ammonium chloride solution which is recovered from the process of precipitating sodium bicarbonate, $NaHCO_3$, and instead thereof by separating ammonium chloride, $NH_4Cl$, from the ammonium chloride solution in solid form by any known process and re-introducing into the ammonia-soda process the ammonia which is produced by the new causticizing process, thus replacing the ammonia which is precipitated in the form of ammonium chloride.

The re-introduction is effected, according to Fig. 2, thereby that the ammonia, $NH_3$, produced during the causticizing process, is directly added to the tank 3b in which solid ammonium chloride is precipitated.

The additionally added ammonia serves not only, as already mentioned, to replace the $NH_3$ removed from the process of alkali manufacture in the form of solid ammonium chloride, but also renders possible a satisfactory precipitation of the solid ammonium chloride itself.

According to a process which is itself already known, solid ammonium chloride can be separated very simply by re-saturating the ammonium chloride liquor with ammonia, then adding further sodium chloride and carbon dioxide to a certain degree of partial saturation and finally cooling the liquid to approximately 5° C.

On cooling under such conditions, solid ammonium chloride is precipitated.

The whole contents of the precipitation tank 3b, after precipitation is complete, are conveyed to the filtering tank 4b for the separation of the precipitated, solid ammonium chloride.

The liquor obtained from this filter, which as already explained, has been saturated with ammonia, sodium chloride and some carbon dioxide in the precipitating tank 3b and further replenished in the same tank with the full complement of chemicals for a new precipitation of sodium bicarbonate, is then fully prepared for the renewed precipitation of the bicarbonate and can therefore be conveyed directly from the filtering tank 4b to the sodium bicarbonate precipitation tank in readiness for a further precipitation of sodium bicarbonate.

From the preceding description the technical advance achieved by the new method of operation and the consequent greatly cheapened production of the two new by-products of the caustic soda produced by the ammonia-soda process, namely, ammonia, $NH_3$, and ammonium chloride, ($NH_4Cl$,) will be obvious. Moreover, as has been shown, the whole manufacture constitutes a closed cycle of raw materials and manufactured products.

Compared with the ammonia-soda process for the manufacture of sodium hydroxide, as hitherto used and as described earlier in this description for comparison, the modification of a portion of the complete process involves no serious extension of the required series of operations. On the other hand, an exceedingly important improvement of the economic result of the complete ammonia-soda process for the production of caustic soda, NaOH, is thus effected by means of which several valuable, salable products are simultaneously produced extremely cheaply, in consequence of the modifications constituting the present invention.

I claim:

1. The method of producing ammonium chloride and sodium hydroxide comprising introducing carbon dioxide into a solution containing sodium chloride and ammonia, whereby sodium bicarbonate is precipitated and ammonium chloride is obtained in solution, treating the precipitated sodium bicarbonate in the presence of carbon with nitrogen at an elevated temperature, whereby sodium cyanide is produced, reacting the said sodium cyanide with steam at an elevated temperature, whereby ammonia and sodium hydroxide are produced and returning the evolved ammonia to the ammonium chloride solution, whereby the latter compound is obtained in solid form.

2. The method of producing ammonium chloride and sodium hydroxide comprising introducing carbon dioxide into a solution containing sodium chloride and ammonia, whereby sodium bicarbonate is precipitated and ammonium chloride is obtained in solution, treating the precipitated sodium bicarbonate in the presence of carbon with nitrogen at an elevated temperature, whereby sodium cyanide is produced, reacting the said sodium cyanide with steam at a temperature between 400° and 500° C., whereby ammonia and sodium hydroxide are produced and returning the evolved ammonia to the ammonium chloride solution, whereby the latter compound is obtained in solid form.

3. The method of producing ammonium chloride and sodium hydroxide comprising introducing carbon dioxide into a solution containing sodium chloride and ammonia, whereby sodium bicarbonate is precipitated and ammonium chloride is obtained in solution, treating the precipitated sodium bicarbonate in the presence of carbon with nitrogen at a temperature of about 1,000° C., whereby sodium cyanide is produced, reacting the said sodium cyanide with steam at a temperature between 400° and 500° C., whereby ammonia and sodium hydroxide are produced, and returning the evolved ammonia to the ammonium chloride solution, whereby the latter compound is obtained in solid form.

In testimony whereof I have signed my name to this specification.

FRIEDRICH BARTLING.